United States Patent [19]
Brimmage et al.

[11] Patent Number: 6,049,529
[45] Date of Patent: Apr. 11, 2000

[54] INTEGRATION OF A PATH VERIFICATION MESSAGE WITHIN A SIGNAL

[75] Inventors: Ashley Brimmage; Bryan McGlade, both of Plano, Tex.

[73] Assignee: MCI Communications Corporation, Washington, D.C.

[21] Appl. No.: 08/825,440

[22] Filed: Mar. 28, 1997

(Under 37 CFR 1.47)

[51] Int. Cl.[7] ....................................................... H04J 1/16
[52] U.S. Cl. .......................................... 370/248; 370/241
[58] Field of Search ..................................... 370/248, 247, 370/241, 251, 253, 332, 333, 347, 441, 321, 337, 242, 244, 245, 250, 509, 476, 470, 215, 217, 221, 222, 223, 225, 226; 375/213; 379/2, 16, 26, 29, 34, 1, 221; 340/825.01, 827

[56] References Cited

U.S. PATENT DOCUMENTS 5,623,481  4/1997  Russ et al. ............................... 370/248

*Primary Examiner*—Dang Ton

[57] ABSTRACT

A path verification message is integrated into a signal, or data stream, that traverses along a path connecting two end nodes of a distributed restoration network within a telecommunications network. To ensure that the integrated path verification message is transparent to equipment positioned along the path, the time period between the successive time intervals whereat the signal is probed by the nodes and the equipment is provisioned to have a predefined portion during which the value of at least one bit of each frame of the signal can be varied. The path verification message is subdivided into a number of parts so that successive parts are integrated into successive predefined portions of corresponding successive time periods. Upon receipt of the requisite successive time periods, the various parts of the path verification message are recombined to form the path verification message.

36 Claims, 6 Drawing Sheets

"First Part" PV Message Structure:

"Second Part" PV Message Structure:

"Third Part" PV Message Structure:

"Fourth Part" PV Message Structure:

"Fifth Part" PV Message Structure:

"Sixth Part" PV Message Structure:

"Seventh Part" PV Message Structure:

"Eighth Part" PV Message Structure:

INTEGRATION OF A PATH VERIFICATION MESSAGE WITHIN A SIGNAL

RELATED APPLICATION

This invention relates to application Ser. Nos. 08/483,525, now U.S. Pat. No. 5,623,481, and 08/483,595, now abandoned, both filed Jun. 7, 1995 and assigned to the same assignee of the instant invention. This invention further relates to application entitled "Method and System Therefor of Confining Path Verification Signals Within a Distributed Restoration Network" (RIC-96-092) filed Mar. 28, 1997 bearing Ser. No. 08/825,441, also assigned to the same assignee as the instant invention. The respective disclosures of the hereto related applications are incorporated by reference herein.

FIELD OF THE INVENTION

This invention relates to digital signals traversing across a telecommunications network and more particularly the integration of a message onto those signals for verifying the integrity of a path through which those signals traverse.

BACKGROUND OF THE INVENTION

In a telecommunications network having a plurality of interconnected nodes, certain portions of the network include subsets of interconnected nodes that may be defined to have the ability to dynamically restore traffic disrupted along paths interconnecting those nodes. Each subset of such nodes may be referred to as a distributed restoration network within the telecommunications network or simply a distributed restoration domain, or more specifically a dynamic transmission network restoration (DTNR) domain. A distributed restoration algorithm (DRA) is stored in each node of the distributed restoration domain.

As is well known, different paths may be effected in the telecommunications network through which traffic signals are routed. A path may be established within the telecommunications network, or within any restoration domain within the network. No matter how long or short each path is, the one thing that remains constant is that each path has to have two end points, i.e., two end nodes.

In a distributed restoration domain, once a path is formed connecting two end nodes, which may also be referred to as access/egress nodes within the domain, no matter how many intermediate nodes and links are used to forge the path, the two end nodes within the restoration domain through which the path extends remain the same. Thus, given the ability of the nodes within the restoration domain to dynamically restore disrupted traffic by finding alternate routes, the traffic traversing between the two end nodes may in fact be routed differently by different interconnected intermediate nodes. The integrity of any route that connects the two end nodes therefore needs to be verified, particularly when there may in fact be different routes connecting the two end nodes. But such path verification must be done non-obtrusively, as equipment and facilities along the path may be affected by such path verification messages. Moreover, such verification of the integrity of the path has to be continuous, at least with respect to the traffic data that is being conveyed along the path, so that if the path is no longer robust, only a minimal amount of data is lost.

It is therefore an objective of the present invention to provide a method and a network therefor wherein path verification messages can be discretely integrated to or carried by the traffic signals traversing along the path.

BRIEF DESCRIPTION OF THE DRAWINGS

The above-mentioned objectives and advantages of the present invention will become more apparent and the invention itself will be best understood by reference to the following description of the invention taken in conjunction with the accompanying drawings, wherein.

DETAILED DESCRIPTION OF THE PRESENT INVENTION

Figure 1:
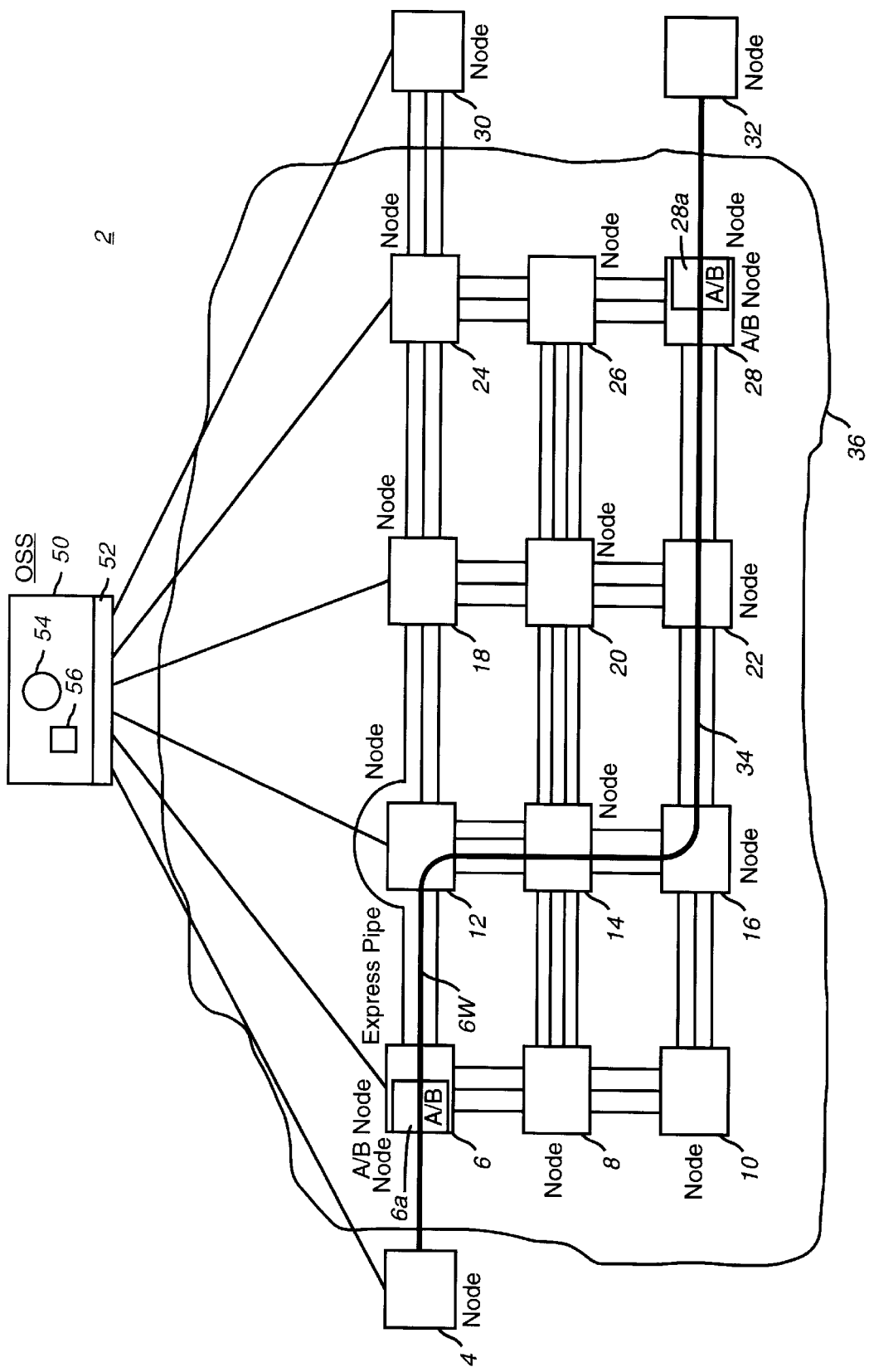
FIG. 1 illustrates a telecommunications network having a plurality of interconnected nodes, a subset of which defining a DTNR restoration domain though which a path extends for carrying traffic to and from other regions of the telecommunications network.

With reference to FIG. 1, an exemplar telecommunications network 2 is shown to have a plurality of interconnected nodes 4–32. A subset of those nodes, namely nodes 6–28, each are deemed to be adaptable to dynamically restore disrupted traffic insofar as each of those nodes has stored therein a distributed restoration algorithm (DRA).

A communications path 34 is shown to traverse between nodes 4 and 32, particularly passing through nodes 6, 12, 14, 16, 22 and 28. As shown in FIG. 1, nodes 4 and 32 are outside the confines or boundary indicated by line 36. Given that nodes 6–28 confined within boundary 36 each have a DRA algorithm stored therein so as to be adaptable to dynamically restore disrupted traffic, those interconnected nodes in combination may be referred to as a distributed restoration network, or a dynamic transmission network restoration (DTNR) domain 36. Note that even though only one DTNR restoration domain is shown in the exemplar telecommunications network of FIG. 1, in actuality, there may be a number of restoration domains dispersed throughout a telecommunications network.

As shown in FIG. 1, an exemplar path 34 interconnects and extends through a number of the nodes within restoration domain 36. These path interconnected nodes are 6, 12, 14, 16, 22 and 28. Since it is by way of nodes 6 and 28 that path 34 extends outside domain 36, nodes 6 and 28 each are referred to as an end node, or an access/egress node, within domain 36. As such, each of nodes 6 and 28 is equipped with at least one access/egress port, designated 6a and 28a, respectively, for interfacing with nodes such as for example nodes 4 and 32 outside restoration domain 36.

For the exemplar embodiment shown in FIG. 1, assume that traffic is being input to restoration domain 36 along communications path 34 by way of node 4. Thus, traffic signals enter access/egress port 6a of node 6, and are cross-connected to a working link, such as for example 6w, which in turn is connected to an adjacent intermediate node 12. Communications path 34 is further formed by the interconnection of the working links between the other intermediate nodes 14, 16, 22 and end node 28. The signals are routed outside of restoration domain 36, via port 28a of node 28, to node 32 for example.

Figure 2:
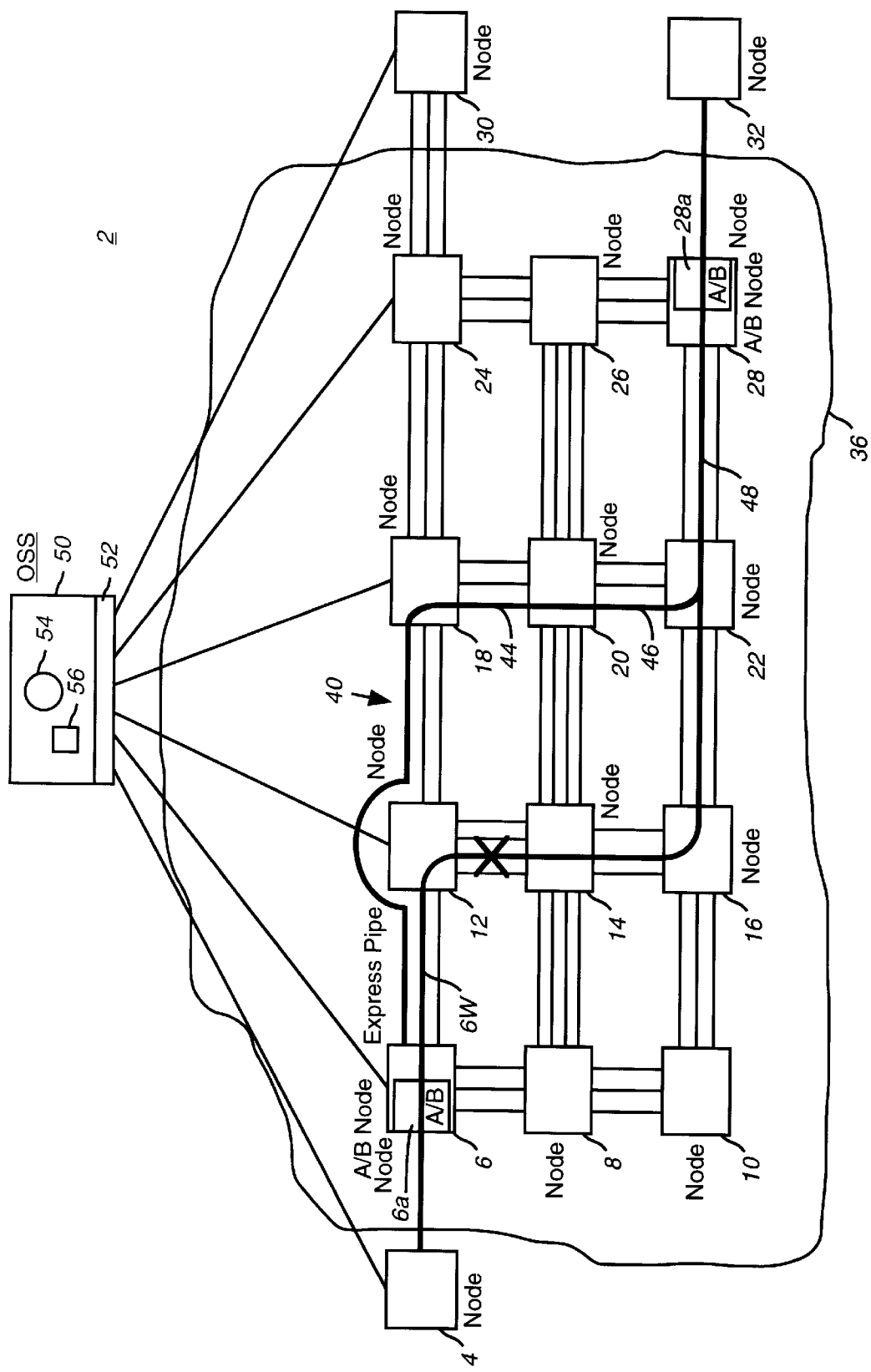
FIG. 2 illustrates a break in the path extending along the DTNR restoration domain of FIG. 1, and an alternate path through which disrupted traffic is rerouted.

The nodes within restoration domain 36 can be dynamically interconnected to form various paths to reroute traffic around any failed portion within restoration domain 36. For example, as shown in FIG. 2, a fault 38 has occurred on communications path 34 between nodes 12 and 14. For discussion purposes, fault 38 can be considered to be a cut of the link connecting node 12 and 14, or the malfunctioning of either of nodes 12 or 14.

Since each of the nodes within restoration domain 36 is adaptable to find alternate route(s) to reroute disrupted traffic, upon sensing a fault, restoration process commences at the appropriate nodes. With reference to FIG. 2, assume that an alternate path 40 interconnecting nodes 6, 18, 20, 22 and 28 has been found in restoration domain. Note that node 6 is connected to node 18 by an express pipe 42, node 18 to node 20 by a spare link 44, node 20 to node 22 by a spare link 46, and node 22 to node 28 by a spare link 48. Alternate path 40 therefore connects end node 6 to end node 28 via intermediate nodes 18, 20 and 22.

Referencing both FIGS. 1 and 2, note that end nodes 6 and 28 remain the same for communications path 34 and alternate communications path 40. In other words, nodes 6 and 28 remain the end nodes for different communications paths in restoration domain 36 from which traffic traverses in and out of the domain despite fault 38. No matter that end nodes 6 and 28 may be connected by different routes, the continuity of each of the possible communications paths nonetheless needs to be continuously verified, so that traffic can be confidently routed to the path connecting the two end nodes. Putting it differently, verification must be performed to ensure that a signal received at the appropriate transceiving port of one node is in fact the same signal that was dispatched from a particular transceiving port of another given node within the restoration domain. Thus, for the exemplar illustrations shown in FIGS. 1 and 2, assuming that a data signal is provided to access/egress port 6a of node 6 from node 4 and the signal is then provided from access/egress port 28a of node 28 to node 32, verification must be made to ensure that the signal being transmitted from node 6 at port 6a indeed is the same signal that arrives at access/egress port 28a of node 28. The integrity of the communications path, be it the original or the alternate, therefore has to be verified. To verify the integrity of a communications path defined by two ends nodes, a verification signal needs to be sent from one of the end nodes to the other.

The exemplar telecommunications network 2 is assumed to be a network that is adaptable to carry digital signals. The network is made up of channel banks, multiplexers, digital switches, and digital cross-connect switches that made up the nodes, as well as synchronous transport signal (STS-n) circuit or SONET circuits. Although not shown, note that facilities and equipment are positioned along the path of the various communications path, such as for example path 34 of restoration domain 36, that extends outside the restoration domain. The verification message may in fact affect the operation of these facilities and/or equipment. In the aforenoted co-pending application RIC-96-092, there is disclosed a method and system therefor of confining such path verification messages within the restoration domain. That aside, there still remains the problem of how to provide such verification message without affecting the operation of the nodes of the telecommunications network, or for that matter, causing any changes in the signal that is being transmitted along the path of interconnected nodes.

With respect to FIGS. 1 and 2, note that nodes 4, 6, 12, 18, 24 and 30 each are connected to an operation support system (OSS) 50. Although only the aforementioned nodes are specifically shown to be connected thereto, it should be recognized that each of the nodes of the telecommunications network is connected to OSS 50. The reason that the other nodes are not shown to be physically connected to OSS 50 is for the sake of clarity. In any event, an interface unit 52 in OSS 50 provides the interfacing between OSS 50 and the various nodes. A processor 54 within OSS 50 performs the various processing necessary to ensure the smooth operation of the telecommunications network. For the case of a restoration domain such as 36, data relating to alarms, restoration, spare links and working links are collected and stored in a data store of OSS 50. A table store 56 within OSS 50, for the embodiment being discussed, may contain instructions and routing information for the various nodes when a malfunction occurs in any of the links, or nodes. These routing instructions may be used in real time restoration (RTR), which is different from the distributed restoration performed by the various nodes within restoration domain 36. A discussion of the real time restoration of disrupted traffic is given in the aforenoted '092 co-pending application.

To achieve the dual objectives of not affecting the nodes to which the verification message is sent and not interfering with the signal that is being sent along the path of interconnected nodes, the inventors of the instant invention envision the integrating of a path verification message into the signal that is being transported along the path. To understand the instant invention more clearly, reference now to FIGS. 3 and 4 which show the format of a 44.736 Mbps multiplexed data stream.

As is well known, the American National Standards Institute (ANSI) has promulgated certain standards for telecommunications, such as for example the ANSI T1.107 standard concerning the Digital Hierarchy-Formats Specifications. According to this standard, for signals, more specifically digital signals, traversing across a telecommunications network that includes multiplexers, digital switches, and digital cross-connect systems such as the nodes in the exemplar embodiment of the instant invention, in order to identify the information carried by the signals, a time reference for the data bit stream that makes up the signal is established. For this time reference, a signal frame structure is provided.

In particular, a digital frame is partitioned into two parts, namely the frame overhead and the payload. Where frame overhead functions are provided in data channels, the standard follows the conventions and protocols used in data communications by dictating that octets be transmitted with the least significant bit of the octet being sent first. All other digital signals are transmitted using telephony convention of the most significant bit sent first, with that bit designated as bit 1. Also included in the frame format is a sequence of noncontiguous bits that are included in the frame overhead structure at the beginning of the digital message for identifying the start of a new message interval or frame, so as to provide alignment for correct decoding and demultiplexing of the message at the receiving terminal. Of interest to the inventors in this frame format is the requirement set forth in the ANSI T1.107 standard that the frame overhead has to contain some means for sending alarm messages upstream for recognizing failure downstream. A special case of such recognition of failure is the sending of an alarm indication signal (AIS).

As is well known, there are a number of rates at which a data stream can be transmitted along the paths of a telecommunications network. These so-called "interface rates" include DS1 (1.544 Mbit/s), DS1C (3.152 Mbit/s), DS2 (6.312 Mbit/s), DS3 (44.736 Mbit/s), and DS4NA (139.264 Mbit/s), as set forth in the ANSI T1.107 standard. For the discussion of this invention, the DS3 interface rate of 44.736 Mbit/s is used.

Figure 3:
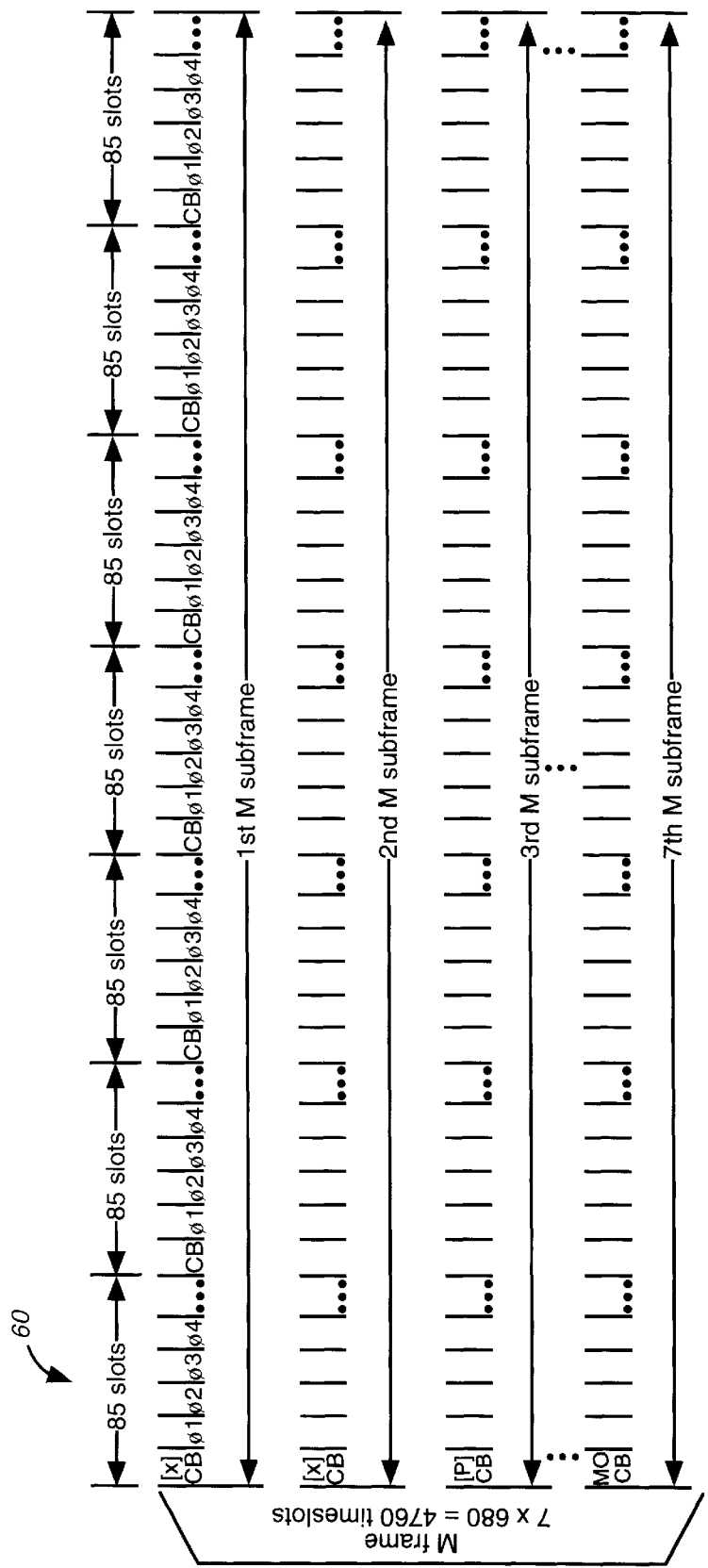
FIG. 3 shows a digital service 3 (DS3) format of a 44.736-Mbps multiplexed data stream.

As shown in FIG. 3, a DS3 signal is partitioned into M frames of 4760 bits each. Each M frame in turn is divided into seven M subframes each having 680 bits. See for example the first, second, third and seventh M subframes shown in FIG. 3. Each of the subframes in turn is further divided into eight blocks of 85 bits with 84 of the 85 bits available for payload and one bit used for the frame overhead. Seven of these blocks are shown in FIG. 3. An example one of these blocks is designated 60.

Figure 4:
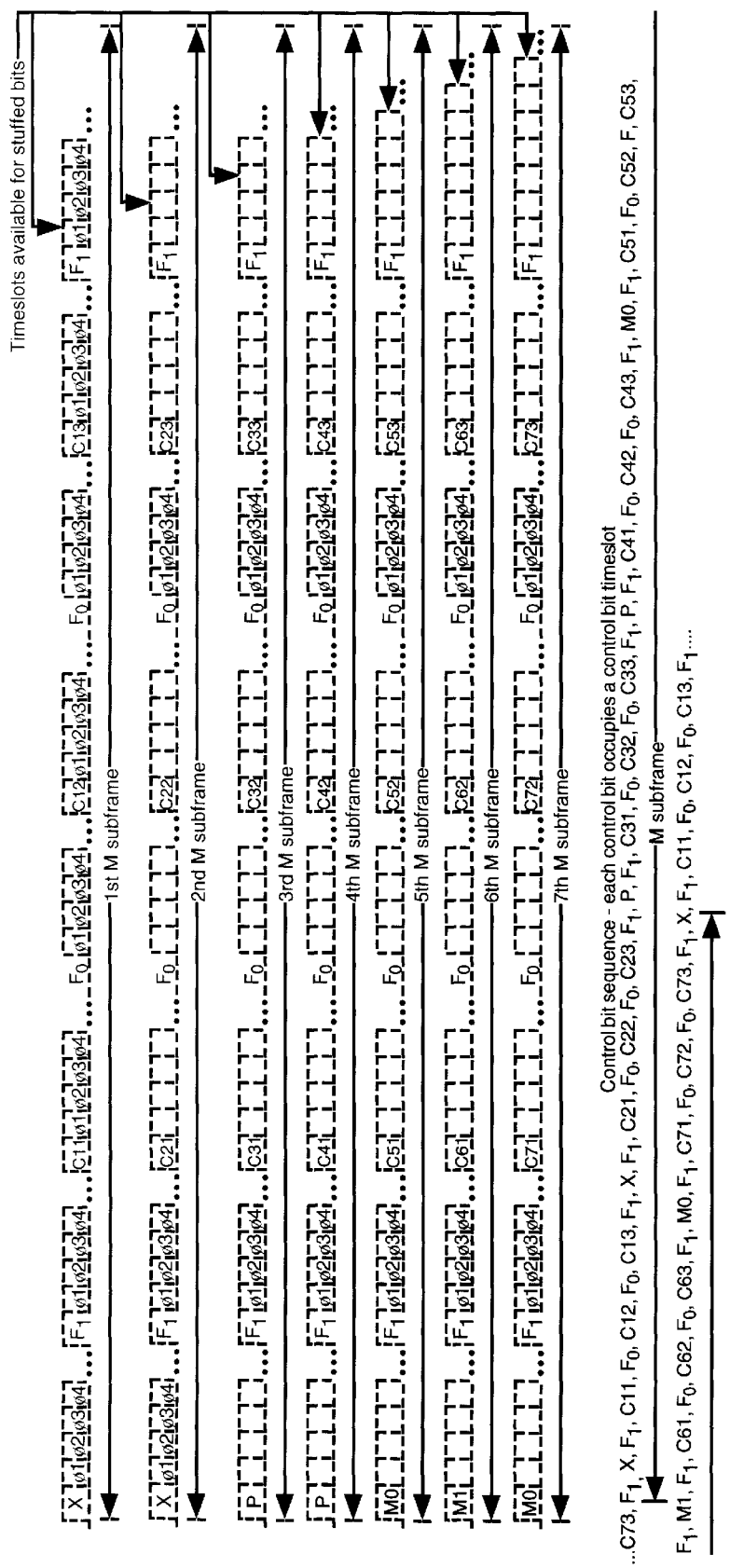
FIG. 4 is a more detailed illustration of the control bits of the FIG. 3 DS3 format.

Given that there are 56 blocks, (8 blocks per M subframe×7 subframes) and an overhead bit in each of the blocks, there are in essence 56 overhead bits in an M frame. As shown in FIG. 4, those 56 frame overhead bits are in turn divided into: M frame alignment channel (M0, M1, and M0), M subframe alignment channel ($F_1$, $F_0$, and $F_1$), a P bit channel (P and P), an X bit channel (X and X), and a C bit channel (C11–C73). Refer to the footnotes of FIG. 4 for a further explanation of the various data bits for the M frame.

For the M frame embodiment shown in FIGS. 3 and 4, note that the M frame alignment channel data bits (M) are used to locate all seven of the M subframes. The M subframe alignment channel data bits (F) are used to identify all frame overhead bit positions. Also, the P bit channel data bits (P) are used for performance monitoring and are usually set to a predefined number such as 1 1 or 0 0. The X bits (X), on the other hand, are used for detecting an alarm, such as an AIS defect. The control of the X bits is by a DS3 source such as for example a switching node. Ordinarily, the X bits are set to 0 (XX=00) upon receipt of an AIS defect. When there is no AIS, the X bits ordinarily are set to 1. Further according to ANSI standard T1.107, a DS3 source should not change the state of the X bits more than once every second.

The integration of a path verification message to a signal traversing along a path between two end nodes in accordance with instant invention is discussed with reference to FIG. 5. For illustration purposes, 9 seconds are shown in the time diagram of FIG. 5. These 9 seconds are in turn divided into 3 time periods consisting of 3 seconds each, as indicated by timer periods 60a, 60b and 60c. For the example shown in FIG. 5, time period 60a is assumed to begin at 0 second, time periods 60b at 3 second and time period 60c at 6 second. Note that the time illustrated in FIG. 5 for the time intervals is arbitrarily chosen, as each time period may in fact have 4 seconds, or 2 seconds etc. Further arbitrarily assigned to each of the time periods 60 is a predefined portion such as 62a in time period 60a, and a remainder portion 64a. Similarly, time period 60b has a predefined portion 62b and a remainder portion 64b, while time period 60c has a predefined portion 62c and a remainder portion 64c. Thus, for the FIG. 3 illustration, a time period of 3 seconds separates each successive time interval, such as for example at 3 second, 6 second and 9 second.

The predefined portion of each time period is shown in more detail, per the expanded view of predefined portion of 62b. As shown, the predefined portion is selected by the inventors to have a time period of 780 ms. Again, such time period is selected arbitrarily and may in fact vary as the occasion arises. In any event, given the DS3 format, each message bit, as part of a frame, is sent every 60 ms. Accordingly, for each of the predefined portions, the first two bits thereof which are received are the sync bits, which occupy the time period from 0 ms to 120 ms. From 120 ms to 780 ms, for the example shown in FIG. 5, 11 data bits are sent. Thus, for the predefined portions of the 3 time periods shown in FIG. 5, 3 groups of 11 data bits are sent. Note that 780 ms is less than the 1 second set forth in the ANSI T1.107 standard, which requires that the state of the X bits not be changed more than once every second.

Recognizing the slowness with which the X bit changes state, the inventors conceive the idea of using the X bit of the M frame for conveying information that could verify the integrity of a path connecting two end nodes, all the while recognizing the fact that any path verification message needs to convey to the end node to which the path verification message is addressed information relating to the node that sent it. In other words, the path verification message must include information relating to the identification of the node, the internet protocol (IP) address of the access/egress node (assuming that the end node of the restoration domain provides access/egress between the portions of the telecommunications network that are not restoration adaptable and the restoration domain), and the specific port from among the many within the node that the message was sent. Putting it simply, as a signal, in this case a data stream, traverses along the path, the nodes such as the digital cross-connect switches and other equipment along the path will probe or scrutinize the signal at preset given time intervals.

As noted above, for the X bit, ANSI standard T1.107 has set a 1 second limitation wherein the value of the X bit will not be changed by the DS3 source. Thus, according to standard practice, no node will read or probe the state of the X bit at intervals of less than 1 second. Recognizing this requirement, the inventors provision the predefined portion of each time period 60 to have 780 ms, so that there is a safety margin of 120 ms under the one second limitation. Accordingly, the value or state of the X bit within the time period 120 ms to 780 ms can be changed or varied to convey information, while being assured that such varying of the state of the X bit remains transparent to the nodes, which, operating in accordance with the standard, will probe only once every second.

To further ensure that the changes in the state of the X bit in the predefined portion of each time period remains transparent to the nodes and any equipment or facilities along the path, remainder portion 64 is provisioned for stabilizing the state of the X bit. To elaborate, assuming there is no malfunctioning in the network and no AIS signal is sent, a X bit, according to the standard, is set to have a state of 0. Further assume that at each of the time intervals, as for example at 3 second, 6 second, and 9 second as shown in FIG. 5, the X bit is probed by a node. To the nodes, the value of the probed X bit at those times should be 0, notwithstanding any changes in the state of the X bit during the predefined portion of the time period that leads to each of those time intervals—since the nodes do not care what went on at the predefined time portion. Thus, to ensure that the value of the X bit is returned to the state it was before the predefined portion, be it a 0 if there is no AIS signal or a 1 if indeed an alarm is detected, a stabilizing time portion 64 is provisioned at each of the time periods, as for example remainder portion 64b for the time period 60b. During remainder portion 64b, the value of the X bit is stabilized to what it was before the predefined portion so that when the X bit is probed at the end of that time period, its value will not be different from before. In fact, the value of the X bit will remain the same for the successive time intervals, unless an alarm has occurred. Putting it yet another way, the changes of the value of the X bit in the predefined portion should not cause any false alarms, or affect the operation of any equipment along the path. The removal of an integrated path verification message from a data signal is disclosed in the aforenoted co-pending '092 application.

Focus now to the expanded view of predefined portion 62b. Note that, as stated before, 11 data bits are transmitted during the time period between 120 ms to 780 ms, which is based on the standard requirement that successive frames are to be provided from the sender node at every 60 ms. As shown in FIG. 5, the time period of predetermined portion 62b from 120 ms to 780 ms is designated 66.

In order to be able to use the X bit for transmitting the requisite path verification message, the inventors decided to break the path verification message into a number of parts each to be transmitted at the predefined portion of time of a corresponding time period, so that it takes a number of successive time periods for an end node to receive the complete path verification message. Keeping in mind that a path verification message requires at least the identification of the node that sent the message, its IP address and the specific port number from where the message was sent, without limitations, the inventors envision that the path verification message may be broken into 8 different parts, as shown in FIG. 6A–6H. And given that each time period is 3 seconds, for the exemplar embodiment illustrated in FIG. 5, a path verification message resulting from the combination of 8 parts is received by the end node of the path to which the message was sent once every 24 seconds. This 24 second periodic verification of the integrity of the path is deemed to be acceptable.

Figure 5:
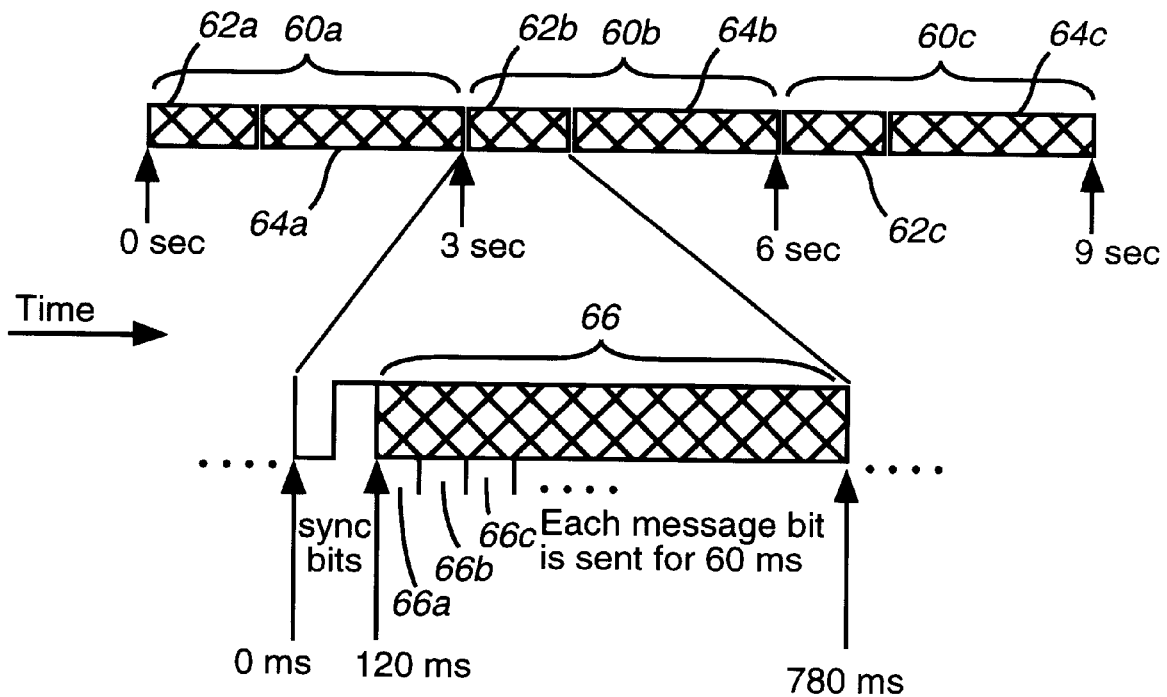
FIG. 5 illustrates a portion of the path verification message of the instant invention and provides the basis for explaining the integration of the path verification message into the data signal traversing along the paths shown in FIGS. 1 and 2.
Figure 6A:
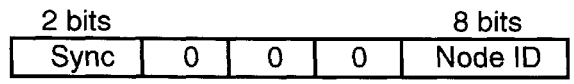
FIGS. 6A–6H each show a structural part of the path verification message of the instant invention.
Figure 6B:
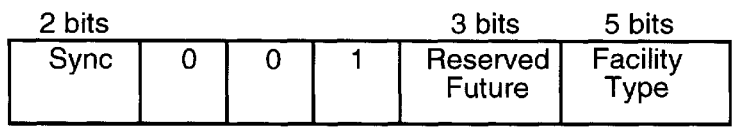

In combination with FIG. 5, note that FIGS. 6A–6H each show a part of a path verification message structure that has 11 data bits. The first two bits of the path verification message structure are, as was discussed before, sync bits for synchronizing the beginning of the time period. The next 3 data bits, each of which can have a value or state of either 1 or 0, in combination provide the identification of the part of the path verification message the predefined portion represents. For example, were predefined portion 62b to have received frames of data every 60 ms with the X bit thereof having a varied value of 000 at time 120 ms, 180 ms and 240 ms, represented respectively as 66a, 66b and 66c in the expanded view of predefined portion 62, the appropriate equipment at the end node for determining the integrity of the path will know that predefined portion 62b carries the first part of the path verification message, whose last 8 data bits in combination are representative of the identification of the node that sends the message. Similarly, the second part of the path verification message, as shown in FIG. 6B, can be integrated to the data stream signal by being sent to predefined portion 62c of time period 60c. This process is repeated until each of the 8 parts is integrated into a given time period 60. When received at the node by the appropriate equipment thereof, these various parts are combined to obtain the complete path verification message. As shown in FIG. 6B, the second part path verification message is identified as 001 and provides information, at its last 5 data bits, relating to the type of facility.

Figure 6C:
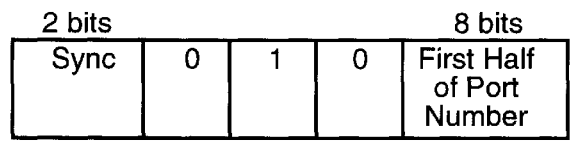
Figure 6D:
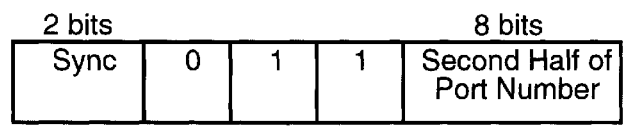
Figure 6E:
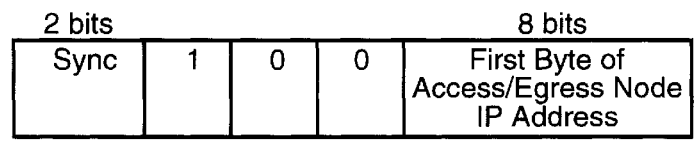
Figure 6F:
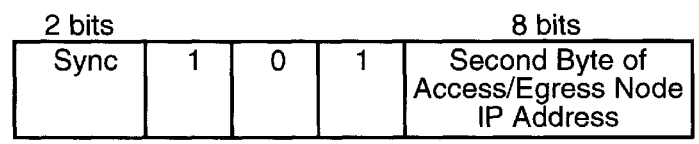
Figure 6G:
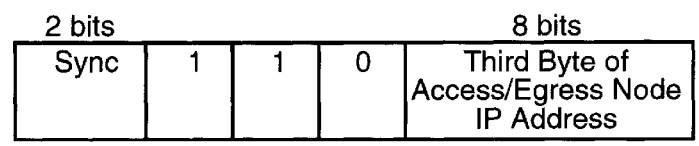
Figure 6H:
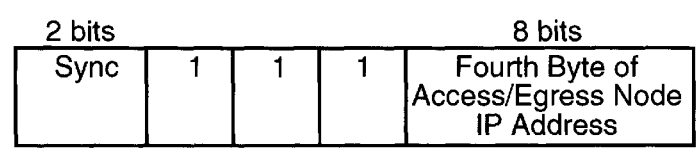

FIG. 6C illustrates that the third part (011) if the path verification message. It provides information relating to the first half of the port number from which the message was sent. The reason that the port number has to be divided into two halves, as illustrated in FIGS. 6C and 6D, is that the complete identification of the port number requires 16 data bits. The fifth part (100) of the path verification message identifies the first byte of the access/egress node IP address, per FIG. 6E, while the sixth part (010) of the path verification message identifies the second byte of the IP address of the access/egress node, per shown in FIG. 6F. The third and fourth bytes of the IP address for the access/egress node, as represented by the seventh part (110) and the eighth part (111), respectively, of the path verification message, are shown in FIGS. 6G and 6H. Thus, for the fifth to eighth parts of the path verification message, the access/egress node IP address provided by the last eight bits of those parts is representative of the IP address (on the network) of the port of the access/egress node that sent the message.

In operation, assume that one frame is transmitted every 60 ms and that only one X bit in a given group of the groups of data bits, such as for instance the X bit at block 60 shown in FIG. 3, is used. Given that the M frame is sent 13 times during each defined portion, such as for example 62b, means that the value of the X bit can be varied 13 times during that predefined portion of the time period, for example 60b. Thus, aside from the sync bits which are sent by the first two frames wherein the value of the X bit remains constant, the next 11 X bits that are sent by way of corresponding 11 frames can each have one of two states so that, when combined, the states of the 11 bits are representative of any one of the 8 parts of the path verification message shown in FIGS. 6A–6H. Once a particular part of the path verification message has been sent per the defined portion 62, to ensure that the state of the X bits that are sent from 780 ms to the end of the time period through successive frames remain constant, a time period of over 2 seconds, as represented by each of remainder portions 64a, 64b and 64c in FIG. 5, is provided. The X bits of the successive frames of data bits that are sent during the remainder portion 64 of the time period have the same state and do not vary. Thus, at the successive time intervals where the value of the X bit is read to determine whether there has been alarm downstream, unless there is indeed an alarm to cause an AIS signal, the value of the X bit at those time intervals will remain as constant.

While a preferred embodiment of the present invention is disclosed herein for purposes of explanation, numerous changes, modifications, variations, substitutions and equivalents in whole or in part, should now be apparent to those skilled in the art to which the invention pertains. For example, even though the present invention has been explained in terms of using the X bit of an M frame in the DS3 format, the inventors perceive the invention to cover other formats using other bits for integrating path verification messages into data signals that are being routed in a telecommunications network. Accordingly, the present invention should be only limited to the spirit and scope of the hereto appended claims.

We claim:

1. In a telecommunications network having a plurality of interconnected nodes and at least one restoration domain defined to include a subset of said interconnected nodes, data streams each including frames of successive groups of multiple data bits traversing through said network, a method of integrating into at least one of said data streams a path verification message as said at least one data stream traverses along a path to verify the integrity of said path within said domain, said path adaptable to extend outside of said domain, said method comprising the steps of:

(a) selecting at least one bit in at least one group of said successive groups of bits that repeats in each frame of said one data stream, the value of said one bit being probed at fixed time intervals by the nodes interconnected to effect said path, said at least one data stream passing through equipment along said path;

(b) determining the time period separating successive ones of said time intervals whereat the value of said one bit is probed by said nodes;

(c) varying the value of said one bit during a predefined portion of each said time period, value changes of said one bit during said predefined portion of each said time period having been determined not to affect the operation of said equipment along said path; and (d) sending frames having said value varied one bit during said predefined portion of said time period along said path, successive ones of said value varied bits of corresponding successive ones of said frames sent during said predefined portion of at least one said time period forming at least one part of said path verification message for confirming the integrity of said path.

2. The method of claim 1, further comprising the step of:

repeating step (d) a predetermined number of times for a predetermined number of said successive time intervals to form said path verification message.

3. The method of claim 2, further comprising the step of:

including at least the identification of the node and the port of said node from which said path verification message originates.

4. The method of claim 1, wherein said frames are in digital signal, level three (DS3) format and wherein said one bit is an X-bit of each of said frames.

5. The method of claim 1, wherein said step (b) further comprises the step of:

provisioning sufficient time for each said time period separating successive ones of said time intervals to ensure that said nodes that probe said one bit continue to see the same value that said one bit had prior to said predefined portion of said time period.

6. The method of claim 1, further comprising the step of:

provisioning said nodes to recognize that an alarm condition exists somewhere along said path when the value of said one bit is found to be different from the value it had had for at least two successive ones of said time intervals.

7. The method of claim 2, further comprising the steps of:

forming said path verification message by combining the various parts of said path verification message obtained from said predetermined number of successive time intervals.

8. The method of claim 1, wherein said one bit is an X-bit and wherein said path verification message comprises eight parts which in combination provide at least information identifying the node that sent the path verification message, the internet protocol (IP) address of said identified node and the port of said node wherefrom said path verification message was sent.

9. The method of claim 1, further comprising the step of:

maintaining the same value for said one bit from the end of said predefined portion of said each time period to the end of said each time period whereat the value of said one bit is probed by the nodes.

10. The method of claim 1, further comprising the steps of:

provisioning said each time period separating successive ones of said time intervals to be 3 seconds; and provisioning said predefined portion of said each time period to be 660 ms.

11. In a telecommunications network having a plurality of interconnected nodes and at least one restoration domain defined to include a subset of said interconnected nodes, a signal having a plurality of frames each including multiple groups of data bits traversing along a path interconnecting two end nodes and intermediate nodes within said domain, a method of provisioning a path verification message within said signal to verify the integrity of said path, comprising the steps of:

(a) for each of said frames, selecting from among at least one group of said groups of data bits at least one given data bit that is probed by the nodes of said domain once every predetermined time interval;

(b) provisioning a portion of each time period between successive ones of said predetermined time interval to have a sufficiently short time period so that any said given data bit carried within said portion avoids scrutiny by said nodes;

(c) varying the value of said given data bit for a selected number of frames of said signal traversing along said path during said portion of said each time period to form at least one part of said path verification message.

12. The method of claim 11, further comprising the step of:

completing the transmission of said selected number of frames to form said path verification message from a combination of the various parts each obtained from one of said selected number of frames.

13. The method of claim 10, wherein said step (b) further comprises the step of:

provisioning said portion of said each time period between successive ones of said predetermined time interval to have a sufficiently short time period so that any said given data bit carried within said portion avoids scrutiny from equipment positioned along said path extending outside of said domain.

14. The method of claim 11, wherein said frames are in digital signal, level three (DS3) format and wherein said given data bit is an X-bit of each of said frames.

15. The method of claim 11, further comprising the step of:

provisioning sufficient time for said each time period to ensure that any of said nodes that probes said given data bit at each said successive time interval continues to see the same value for said given data bit notwithstanding any changes of the value of said data bit during said portion of said each time period.

16. The method of claim 11, further comprising the step of:

provisioning each of said nodes to recognize that an alarm condition exists somewhere along said path when the value of said given data bit, when probed, is found to be different from the value it had had for at least two successive ones of said time intervals.

17. The method of claim 11, wherein said given data bit is an X-bit of said frame and wherein said path verification message comprises eight parts which in combination provide at least information identifying the node that sent the path verification message, the internet protocol (IP) address of said identified node and the port of said identified node wherefrom said path verification message was sent.

18. The method of claim 1 1, further comprising the step of maintaining the same value for said given data bit from the end of said portion to the end of each said respective time period whereat the value of said given data bit is probed by the nodes.

19. The method of claim 11, further comprising the steps of:

provisioning each said respective time period separating successive ones of said time intervals to be 3 seconds; and provisioning said portion of said each time period to be 660 ms.

20. A telecommunications network comprising:

a plurality of interconnected nodes;

at least one restoration domain defined to include a subset of said interconnected nodes;

an end node within said domain outputting a signal having a plurality of frames each including multiple groups of data bits along a path interconnecting said end node via intermediate nodes to another end node within said domain; and processing means for provisioning a path verification message within said signal to verify the integrity of said path, wherein said processing means for each of said frames, selects from among at least one group of said groups of data bits at least one given data bit that is probed by the nodes of said domain once every predetermined time interval, provisions a portion of each time period between successive ones of said predetermined time interval to have a sufficiently short time period so that any said given data bit carried within said portion avoids scrutiny by said nodes; and for a selected number of frames of said signal traversing along said path, varying the value of said given data bit a predefined number of times during said portion of said each time period to form at least one part of said path verification message.

21. The network of claim 20, wherein said selected number of frames each providing a given part of said path verification message are combined to form said path verification message.

22. The network of claim 10, further comprising:

equipment positioned along said path extending outside of said domain;

wherein said processing means further provisions said portion of said each time period between successive ones of said predetermined time interval to have a sufficiently short time period so that any said given data bit carried within said portion avoids scrutiny from said equipment.

23. The network of claim 20, wherein said frames are in digital signal, level three (DS3) format and wherein said given data bit is an X-bit of each of said frames.

24. The network of claim 20, wherein said processing means further provisions sufficient time for said each time period to ensure that any of said nodes that probes said given data bit at each said successive time interval continues to see the same value for said given data bit notwithstanding any changes of the value of said data bit during said portion of said each time period.

25. The network of claim 20, wherein each of said nodes is adaptable to recognize that an alarm condition exists somewhere along said path when the value of said given data bit, when probed, is found to be different from the value it had had for at least two successive ones of said time intervals.

26. The network of claim 20, wherein said given data bit is an X-bit of said frame and wherein said path verification message comprises eight parts which in combination provide at least information identifying the node that sent the path verification message, the internet protocol (IP) address of said identified node and the port of said identified node wherefrom said path verification message was sent.

27. The network of claim 20, wherein said processing means further provisions said given data bit to have the same value from the end of said portion to the end of each said time period whereat the value of said given data bit is probed by the nodes.

28. The network of claim 20, wherein said processing means further provisions each of said respective time periods separating successive ones of said time intervals to be 3 seconds and said portion of each said respective time period to be 660 ms.

29. In a telecommunications network having a plurality of interconnected nodes and at least one restoration domain defined to include a subset of said interconnected nodes, a signal having a plurality of frames each including multiple groups of data bits traversing along a path interconnecting two end nodes and intermediate nodes within said domain, a path verification message being embedded in said signal comprising:

a plurality of parts each being formed from a plurality of at least one given data bit each selected from among at least one group of said multiple groups of data bits in each of said frames, said given data bit being probed by the nodes in said domain once every predetermined time interval, a portion of each of respective time periods separating successive ones of said time interval being provisioned to have a sufficiently short time period so that any said given data bit transmitted within said portion avoids scrutiny by said nodes, the value of said given data bit for a selected number of said frames being varied during said portion of said each respective time period to form one part of said path verification message.

30. The path verification message of claim 29, wherein said frames are in digital signal, level three (DS3) format and wherein said given data bit is an X-bit of each of said frames.

31. The path verification message of claim 29, wherein said plurality of parts each comprise a message structure having a sync subpart, a part identification subpart and an information carrying subpart.

32. The path verification message of claim 31, wherein said plurality of parts comprise 8 message structures.

33. The path verification message of claim 29, wherein, when probed by said nodes, any change in the value of said given data bit which is different from the value it had had for at least two successive ones of said time intervals is recognized by each of said nodes as an indication that an alarm condition exists somewhere along said path.

34. The path verification message of claim 29, wherein said given data bit is an X-bit of each of said frames and wherein said path verification message comprises eight parts which in combination provide at least information identifying the node that sent the path verification message, the internet protocol (IP) address of said identified node and the port of said identified node wherefrom said path verification message was sent.

35. The path verification message of claim 29, wherein the value of said given data bit is maintained to be the same from the end of said portion to the end of each said respective time period whereat the value of said given data bit is probed by the nodes.

36. The path verification message of claim 29, wherein each of said respective time periods separating successive ones of said time intervals is provisioned to be 3 seconds; and wherein said portion of each said respective time period is provisioned to be 660 ms.

* * * * *